United States Patent Office 3,371,098
Patented Feb. 27, 1968

3,371,098
5- AND 6-METHOXY-3-(PHENOXYETHYL-AMINOETHYL)-INDOLES
Teunis Kralt and Johannes Maria Antonius Zwagemakers, Van Houtenlaan, Weesp, Netherlands, assignors to North American Philips Company, Inc., New York, N.Y., a corporation of Delaware
No Drawing. Continuation of application Ser. No. 445,726, Apr. 5, 1965. This application Nov. 29, 1966, Ser. No. 597,796
9 Claims. (Cl. 260—326.14)

This application is a continuation of application Ser. No. 445,726, filed April 5, 1965 and now abandoned.

The invention relates to new secondary and tertiary indolylethylamines of the Formula I and salts thereof

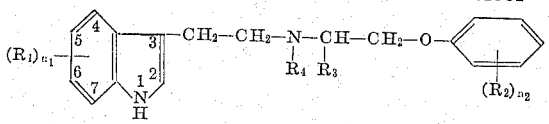

in which formula $R_1$ is a hydroxy- or an alkoxy group and $n_1=1$ or 2, $R_2$ is a hydroxy- or alkoxy substituent, $n_2=0$ or 1, and $R_3$ is a hydrogen atom or an alkyl group having 1–4 carbon atoms and $R_4$ is a hydrogen atom, an alkyl group having 1–4 carbon atoms, or a group of the Formula I'.

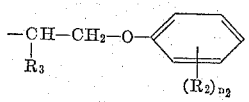

Of these compounds important pharmacological activities were found and they may consequently be used as active constituents in pharmaceutical compositions according to the invention.

For example, these new compounds have a strong sedative, an anti-convulsive, and an analgetic activity. The compounds according to the invention distinguish in particular from other chemically closely relative compounds by a strong and prolonged hypotensive action.

A very favourable hypotensive activity is found in particular in those compounds according to the invention of Formula I, in which $R_1$ is a methoxy group in 5- or 6-position of the indole skeleton, $R_3$ and $R_4$ each represent a hydrogen atom and $R_2$ is a methoxy group in the ortho- or the para-position of the phenoxy group.

The hypotensive activity was determined in normotensive narcotised dogs and cats and in non-narcotised dogs. In the narcotised animals the determination was carried out in a bloody manner by means of a canula in the carotid artery which was connected to a capacitive transducer.

Of the compound of the Formula II

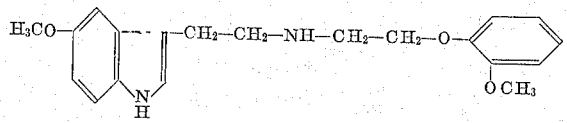

for example, both the oxalic acid salt and the acetic acid salt, administered intravenously in a dosage of 1 mg. per kg. of body weight, caused a fall in blood pressure with a minimum depth of 15% for more than 5 hours, both diastolically and systolically without preceding rise in blood pressure.

A dosage of 10 mg. per kg. causes a minimum decrease of 40% for 40 minutes.

In non-narcotised dogs, oral administration of these substances in a dosage of 25 mg. per kg. resulted in a fall in blood pressure which was clearly observable even 24 hours after administration.

The compound of Formula III

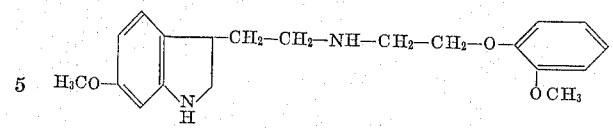

resulted in a minimum decrease of 15% for 4 hours when administered intravenously in the narcotised dog in a dosage of 1 mg. per kg., whereas in a dosage of 10 mg. per kg. the activity was found to be approximately equal to that of the compound of Formula II.

The compounds of the Formulae II and III were also found to have a strong adrenolytic activity. In experiments with the isolated vas deferens of the rat, a 1.6 times as strong alphalytic activity as that of the drug 1-(p-hydroxyphenyl) - 2 - (1 - methyl - 2 phenoxyethylamino) 1-propanol hydrochloride was found for the compound of Formula II and the activity was 5.3 times as strong for the compound of the Formula III.

Of the compound of Formula IV

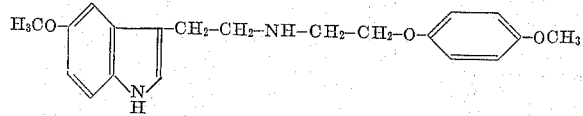

it was found in these experiments that although the activity in a dosage of 1 mg. per kg. was lower than that of the compound of Formula III, in a dosage of 10 mg. per kg., a fall in blood pressure of 40% occurred for 2.5 hours.

In Table I the results of a few pharmacological experiments are stated for a number of compounds according to the invention.

The neurotoxicity was investigated in mice during the first 60 minutes after intraperitoneal administration. It was investigated in how far a number of normally absent reflex reactions were suppressed. From the results obtained the $ED_{50}$ value was calculated for each criterion used. In the table the lowest $ED_{50}$ value is stated.

The same mice were used for the determination of the lethal effect 24 and 48 hours respectively after administration of the substance.

The potentiating effect of the substances on the depressive effect of hexobarbital was determined in mice. The compound was administered 30 minutes prior to a dose of hexobarbital which was just not narcotic and which was administered intravenously (30 mg. per kg.).

The potentiation of the alcohol narcosis was determined by observing the influence of the duration of the alcohol narcosis in the mouse. Alcohol (3.2 g. per kg. as a 16% solution of ethanol in water) was administered interperitoneally 30 minutes after the interperitoneal administration of 25 mg./kg. of the substance to be tested. Determined was the duration of narcosis as the duration of time of absence of the elevator reflex. In Tables I and II the effect is expressed as a percentage of the duration of narcosis of a control group treated in the same manner with alcohol.

The anti-convulsive activity was determined of the compounds according to the invention with respect to the convulsive effect of a supermaximum dosage of metrazol (50 mg./kg.) in the mouse, 30 minutes after interperitoneal administration of the substance to be tested.

The analgetic activity was determined by the method of Bianchi (Brit. J. Pharm. 9 (1954), 280).

The spasmolytic activity was determined in vitro by means of pieces of guinea pig ileum, both with $BaCl_2$ and with carbaminoyl chloride (Doryl) as a spasmogen and in both cases with papaverine as the standard.

In the last column the hypotensive effect is stated as it followed from the experiments described in greater detail above for the compounds of the Formulae II, III and IV. In this column, +++ means a strong and prolonged hypotensive effect, ++ in a lower dosage a comparatively strong effect which, however, was of a short duration, + in a dosage of 10 mg./kg. a prolonged effect but in lower dosages a considerably less strong effect than the compound of Formula III.

as $R_2$ or is an etherified or esterified hydroxyl group which, after the reaction, is converted into a free hydroxy group by hydrolysis or hydrogenolysis, and X is a halogen atom in which case $n_3=1$ or a double bond oxygen atom, in which case $n_3=0$ and $R_4'$ must be a hydrogen atom, the intermediately formed Schiff base being converted into the amine of Formula I by reduction.

Alternatively, the compounds according to the invention can be obtained by causing a compound of the Formula V'

TABLE I

| Substance according to Formula I | | | | Neuro toxicity $ED_{50}$, mg./kg. | $LD_{50}^{24}$, mg./kg. | $LD_{50}^{48}$, mg./kg. | Pot. Hexobarb. narcosis $ED_{50}$, mg./kg. | Pot. Alcohol narcosis effect 25 mg./kg. in percent |
|---|---|---|---|---|---|---|---|---|
| $R_1$ | $R_2$ | $R_3$ | $R_4$ | | | | | |
| 5-OCH₃ | ortho-OCH₃ | H | H | 19 | 79 | 58 | 3.2 | >3,500 |
| 6-OCH₃ | ortho-OCH₃ | H | H | 7 | 108 | 108 | 1.7 | 1,900 |
| 5-OCH₃ 6-OCH₃ | } ortho-OCH₃ | H | H | 43 | 162 | 162 | 16 | 180 |
| 5-OH | ortho-OCH₃ | H | H | 32 | 147 | 147 | 5.8 | 260 |
| 5-OCH₃ | para-OCH₃ | H | H | 21 | 147 | 147 | 17 | 180 |
| 5-OCH₃ | no substitution | CH₃ | H | 20 | 79 | 79 | 15 | 470 |
| 5-OCH₃ | no substitution | H | H | 42 | 147 | 126 | 11 | 850 |
| 5-OCH₃ | ortho-OCH₃ | H | C₂H₅ | 19 | 126 | 126 | 11 | 430 |
| 6-OCH₃ | ortho-OCH₃ | H | C₂H₅ | 24 | 88 | 75 | 8.8 | 840 |
| 5-OCH₃ | ortho-OCH₃ | H | —CH₂—CH₂—O—⟨phenyl-OCH₃⟩ | | | | | |

TABLE II

| Substance according to Formula I | | | | Anticonvulsant Metrazol $ED_{50}$, mg./kg. | Analgesia $ED_{50}$, mg./kg. | Spasmolysis papaverine=1 | | Blood pressure |
|---|---|---|---|---|---|---|---|---|
| $R_1$ | $R_2$ | $R_3$ | $R_4$ | | | BaCl₂ | Doryl | |
| 5-OCH₃ | ortho-OCH₃ | H | H | 21 | 38 | 3.0 | 1.8 | +++ |
| 6-OCH₃ | ortho-OCH₃ | H | H | | 32 | 3.1 | 1.4 | ++ |
| 5-OCH₃ 6-OCH₃ | } ortho-OCH₃ | H | H | 24 | 62 | 1.0 | 0.5 | + |
| 5-OH | ortho-OCH₃ | H | H | 82 | 68 | | | + |
| 5-OCH₃ | para-OCH₃ | H | H | | 37 | 3.1 | 2.0 | ++ |
| 5-OCH₃ | no substitution | CH₃ | H | | 35 | 3.1 | 2.3 | + |
| 5-OCH₃ | no substitution | H | H | 46 | 46 | 2.1 | 2.9 | + |
| 5-OCH₃ | ortho-OCH₃ | H | C₂H₅ | | | 3.6 | 1.6 | + |
| 5-OCH₃ | ortho-OCH₃ | H | C₂H₅ | | 30 | 2.9 | 1.6 | + |
| 5-OCH₃ | ortho-OCH₃ | H | —CH₂—CH₂—O—⟨phenyl-OCH₃⟩ | | | | | + |

The compounds according to the invention can be prepared according to methods which are known per se for the preparation of this type of compounds and according to methods analogous thereto. Good results are obtained, for example, when a compound of the Formula V

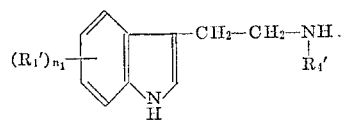

is caused to react with a compound of the Formula VI

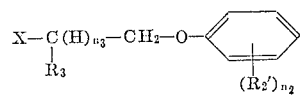

in which formulae $R_1'$ has the meaning of $R_1$ in Formula I or represents one or two etherified or esterified hydroxy groups which are converted into one or two free hydroxy groups after the alkylation reaction by hydrolysis or hydrogenolysis, $R_4'$ has the meaning of $R_4$ or is an aralkyl group which, after the reduction, is replaced by a hydrogen atom by catalytic reduction, $R_2'$ has the same meaning

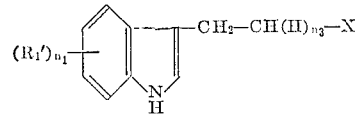

to react with a compound of the Formula VI'

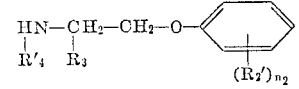

in which formulae the symbols have the same meanings as in Formulae I, V and VI.

Another example of a suitable method for the preparation of compounds according to the invention is that in which a halogenide of the Formula VII

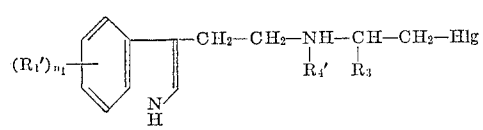

is caused to react with a phenolate of the Formula VIII

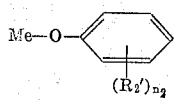

in which formulae Hlg represents a halogen atom and Me a metal atom, preferably an alkali metal atom, and the other symbols may have the meanings indicated for the Formulae I, V and VI.

As hydroxyl groups $R_1'$ and/or $R_2'$ protected during the alkylation reaction are to be considered in particular aralkoxy groups, for example benzyloxy-, diphenylmethoxy- or triphenylmethoxy groups.

The alkylation reaction of the tryptamine derivative of the Formula V with a halogenide of the Formula VI is preferably carried out with the chloride, bromide or iodide in a solvent and in the presence of a base which is capable of binding the released hydrohalogenic acid.

For the preparation of secondary amines of the Formula I it is to be preferred to use a tryptamine as the starting material in which either of the two hydrogen atoms at the exocyclic nitrogen is replaced by a group which after the alkylation reaction can be replaced again in simple manner by a hydrogen atom. Preferably, therefore, $R_4'$ in the compound of Formula V has the meaning of an aralkyl group, in particular a benzyl group, in this reaction. The resulting compounds of the Formula I and salts thereof, in which $R_4$ has the meaning of an aralkyl group, preferably a benzyl group, are new substances and, according to the invention, are valuable intermediate products for the preparation of important pharmacologically active compounds. By catalytic reduction, preferably by hydrogenation in the presence of a platinum or palladium catalyst, this aralkyl group in these new compounds is replaced by a hydrogen atom.

If X in Formula VI has the meaning of a double-bond oxygen atom, reductive alkylation of the primary tryptamine derivative results in secondary amines of the Formula I in which, if desired, for example, by reaction with an alkyl halogenide or sulphate, the group $R_3$ may be introduced.

This reductive alkylation reaction also may be carried out in any manner known in the art with or without intermediate isolation of the intermediately formed Schiff base. Good results are obtained, for example, when approximately equimolar quantities of amine and carbonyl compounds are combined in an inert solvent, for example, an alcohol solution, and hydrated in the presence of a noble metal catalyst, for example, a platinum or palladium catalyst.

Both the free bases and salts of the compounds according to the invention can be used for the preparation of new pharmaceutical compositions. As salts are to be considered, for example, acid addition salts of a base of the Formula I with hydrochloric acid, sulphuric acid, phosphoric acid, hydrobromic acid, sulfamic acid, tartaric acid, oxalic acid, citric acid, or acetic acid.

The pharmacologically active substances can be processed in any known manner to pharmaceutical compositions by mixing with or dissolving in solid or liquid carrier materials known in pharmacy, for example, starch, talcum powder, lactose, gelatin, sodium carboxymethyl cellulose, magnesium stearate, and mixtures thereof as solid carrier materials and, for example, water rendered isotonic with blood by means of salt, or water mixed, for example, with glycerine as liquid carriers.

For example, according to the invention new pharmaceutical compositions, such as injection liquids, powders and solid dosage unit forms, such as tablets, coated tablets and suppositories, are obtained which are characterized by a content of at least one of the new substances of Formula I or a salt thereof.

In order that the invention may readily be carried into effect, it will now be described in greater detail with reference to the ensuing specific examples.

EXAMPLE I

N-(O-methoxyphenoxyethyl)-5-methoxytryptamine (a) O-(2-bromoethoxy)-anisol

A mixture of 93 g. of guaiacol, 75 ml. of ethylene bromide, 20 g. of NaOH, and 500 ml. of water was refluxed for 24 hours. Then the mixture was cooled, the two layers of liquid were separated and the uppermost, aqueous, layer was once extracted with ether. The layers of organic liquid were combined, dried by means of $Na_2SO_4$, the solvent was distilled off and the residue distilled in fractions under reduced pressure. The fraction which distilled at 146–155° (at 15 mm.) slowly crystallised to a substance of melting point 43–45° C.

(b) N - benzyl - N - (O - methoxyphenoxyethyl) - 5-methoxytryptamine 7.24 g. (31.8 m.mol) of O-(2-bromoethoxy)-anisol were dissolved in 50 ml. of methyl ethyl ketone (M.E.K.), together with 5.25 g. of NaI and boiled for 30 minutes. The NaBr formed was filtered off and the filtrate was added to a solution of 31.8 m.mol of N-benzyl-5-methoxytryptamine in 50 ml. of M.E.K. After the addition of 5 ml. of triethylamine the total volume was brought to 125 ml. with M.E.K. and the reaction mixture was refluxed for 24 hours.

Then the solvent was removed in vacuo, the oil residue was taken up in chloroform and shaken with a mixture of water and 16 ml. of 2 N sodium hydroxide solution. After separating the chloroform layer the aqueous layer was extracted twice with chloroform. The solvent of the combined chloroform extracts was distilled off in vacuo. The residue was dissolved in 50 ml. of acetone and a solution of 4.01 g. of oxalic acid 2 aq. in 25 ml. of acetone was added to this solution.

After the addition of 125 ml. of ether the solvent was filtered from the product which, after having been washed once again with ether and then dried, was obtained in a yield of 14.8 g.

After recrystallisation from ethanol the thus obtained N-benzyl-N-(O - methoxyphenoxyethyl)-5-methoxytryptamine oxalate showed a melting point of 165–166° C. (decomposition).

(c) N-(O-methoxyphenoxyethyl)-5-methoxytryptamine 5.2 g. of the oxalate obtained according to b were suspended in water and 10 ml. of 2 N sodium hydroxide solution were added, while stirring. The released base was extracted with chloroform. After evaporating the chloroform in vacuo the base was dissolved in glacial acetic acid and 1 g. of a 10% Pd/C catalyst was added to this solution.

The whole was treated with hydrogen at 70–80° C. for 150 minutes. After the completion of the hydrogen take-up another 15 ml. of $PdCl_2$-solution and 1 g. of active carbon were added and then once again treated with hydrogen for 15 hours.

After cooling, the catalyst was filtered off and the filtrate evaporated to dryness in vacuo. The residue (3.86 g.) was taken up in chloroform and washed with water to which 10 ml. of 2 N sodium hydroxide solution had been added. After separating the chloroform layer, the aqueous layer was extracted twice with chloroform and the solvent of the combined chloroform extracts was removed in vacuo.

The oily residue (the free base of N-(O-methoxyphenoxymethyl)-5-methoxytryptamine) (2.98 g.) was taken up in 15 ml. of acetone and a solution of 1.26 g. of oxalic acid 2 aq. in 10 ml. of acetone was added. The oxalate formed was filtered off, washed with acetone and ether and dried. Yield 2.69 g. Crystallisation from ethanol resulted in N-(O-methoxyphenoxyethyl)-5-methoxytryptamine oxalate with melting point 163–165° C. (decomposition).

By treating the free base in a corresponding manner with acetic acid instead of with oxalic acid, the acetate of the above compound of melting point 119–120.5° C. was obtained.

EXAMPLE II

*5-methoxy-N-(phenoxyethyl)-tryptamine*

A solution of phenoxy ethyl iodide was prepared by boiling 2.01 g. of 1-bromo-2-phenoxy ethane and 1.5 g. of NaI in 25 ml. of methyl ethyl ketone for 30 minutes and then filtering off the NaBr formed.

To this solution was added a solution of 3.7 g. of 5-methoxy-N-benzyltryptamine in 20 ml. of methyl ethyl ketone and 1.5 ml. of triethylamine, after which the mixture was refluxed for 24 hours. Then the solvent was distilled off under reduced pressure, the residue taken up in a mixture of 100 ml. of chloroform, 50 ml. of water and 10 ml. of 2 N NaOH and this mixture was thoroughly shaken. After separating the chloroform layer, the aqueous layer was twice extracted with chloroform, the collected chloroform extracts were evaporated under reduced pressure.

3.10 g. of the 5-methoxy-N-benzyl-N(phenoxyethyl)-tryptamine thus obtained were dissolved in 100 ml. of glacial acetic acid. This solution was hydrated at normal pressure and at room temperature by means of 10 ml. of 10% $PdCl_2$ catalyst. After approximately 30 minutes, the calculated quantity of hydrogen had been taken up. The catalyst was removed by filtration, the filtrate evaporated and the residue thoroughly shaken with a mixture of 50 ml. of chloroform, 50 ml. of water and 10 ml. of 2 N NaOH. The chloroform layer was separated off, the solvent removed under reduced pressure and the residue, the free base 5-methoxy-N-(phenoxyethyl)-tryptamine, converted into the oxalic acid salt by taking it up in 35 ml. of acetone, in which 820 mg. of oxalic acid 2 aq. had been dissolved, and filtering off the precipitate formed and washing with acetone and ether.

Obtained were 2.09 g. of this salt which, after recrystallisation from acetone, melted at 177–180° C. (decomposition).

The acetate of the above compound obtained in a corresponding manner had a melting point of 149–152° C. (decomposition).

EXAMPLE III

*5-methoxy-N-(p-methoxyphenoxyethyl)-tryptamine*

By starting from p-methoxyphenylethyliodide instead of from phenoxyethyliodide but otherwise proceeding as described in Example II, the 5-methoxy-N-(p-methoxyphenoxyethyl)-tryptamine, of which the acetate had a melting point of from 124.5 to 126° C. (decomposition), was obtained via the 5-methoxy-N-benzyl-N(p-methoxyphenoxyethyl)-tryptamine, of which the oxalate had a melting point of 149–152° C. (decomposition).

EXAMPLE IV

*5,6-dimethoxy-N-(O-methoxyphenoxyethyl)-tryptamine*

In a similar manner the 5,6-dimethoxy-N-(O-methoxyphenoxyethyl) tryptamine was obtained via the 5,6-dimethoxy-N-benzyl-N-(O - methoxyphenoxyethyl)tryptamine the oxalate of which had a melting point of 125–130° C. The oxalate of this compound melted at 169–173° C. (decomposition). The tryptamine from which was started, the 5,6-dimethoxy-N-benzyltryptamine, was obtained by known methods from 5,6-dimethoxy indole after reaction with oxalyl chloride, treatment of the formed 3-glyoxylic acid chloride with benzylamine and reduction of the N-benzyl-5,6-dimethoxyindole-(3)-glyoxylic acid amide.

EXAMPLE V

*6-methoxy-N-(O-methoxyphenoxyethyl)-tryptamine*

In a manner corresponding to that of Example II the 6-methoxy-N-(O-methoxyphenoxyethyl)-tryptamine was obtained via the 6-methoxy-N-benzyl-N-(O-methoxyphenoxyethyl)-tryptamine, the oxalate of which had a melting point of 165–167° C. (decomposition). Melting point of the acetate 138–139° C. (decomposition).

The amine from which was started, the 6-methoxy-N-benzyltryptamine, is prepared in the manner described in Example IV for the corresponding 5,6-dimethoxy compound.

EXAMPLE VI

*6-methoxy-N-ethyl-N-(O-methoxyphenoxyethyl)-tryptamine*

By alkylating N-ethyl-6-methoxytryptamine with orthomethoxyphenoxyethyliodide in a manner corresponding to that described in Example II, the 6-methoxy-N-ethyl-N-(O - methoxyphenoxyethyl)-tryptamine was obtained, the oxalate of which had a melting point of 174–175° C. (decomposition).

EXAMPLE VII

*5-methoxy-N-ethyl-N-(O-methoxyphenoxyethyl)-tryptamine*

In the same manner and starting from N-ethyl-5-methoxy-tryptamine, the compound 5-methoxy-N-ethyl-N-(O-methoxyphenoxyethyl)-tryptamine was obtained, the oxalate of which had a melting point of 162–164° C. (decomposition).

EXAMPLE VIII

*5-methoxy-N-(phenoxyisopropyl)-tryptamine*

1.90 g. of 5-methoxytryptamine and 2 g. of phenoxyacetone were dissolved in 40 ml. of ethanol. To this solution were added 100 mg. of $PtO_2$ and hydrogen was introduced at normal pressure and at room temperature. The calculated quantity of hydrogen was taken up in 60 minutes. The catalyst was filtered off, the solvent evaporated under reduced pressure and the residue taken up in 10 mg. of acetone. 1 g. of acetic acid in 25 ml. ether was added to this solution. The solvent of the resulting solution was evaporated and the residue was washed with 50 ml. of ether. In this manner 2.49 g. of the acetate of the above tryptamine was obtained with melting point 126–128° C. (decomposition).

EXAMPLE IX

*5-hydroxy-N-(O-methoxyphenoxyethyl)-tryptamine*

In a manner corresponding to that described in Example VIII a solution of 5-benzyloxytryptamine and O-methoxyphenoxyacetaldehyde in ethanol was hydrated at approximately 40° C. in the presence of a $PtO_2$ catalyst. 5-hydroxy-N-(O-methoxyphenoxyethyl)-tryptamine was obtained, the acetate of which had a melting point of 210–213° C. (decomposition).

EXAMPLE X

*N,N-di-(O-methoxyphenoxyethyl)-5-methoxytryptamine*

960 mg. of O-(2-bromoethoxy)anisol and 620 mg. of NaI were boiled in 25 ml. of methyl ethyl ketone for 30 minutes. The NaBr formed was filtered off and 790 mg. of 5-methoxytryptamine and 450 mg. of triethylamine were added to the filtrate. The total volume was brought to 30 ml. with methyl ethyl ketone, after which the reaction mixture was refluxed for 26 hours. After cooling the solvent was removed in vacuo and the oily residue taken up in chloroform. This solution was thoroughly shaken with a mixture of water and 3.5 ml. of 2 N sodium hydroxide solution. After separating the chloroform the aqueous layer was extracted twice with chloroform, the solvent of the combined chloroform extracts was removed in vacuo, and the residue was taken up in 15 ml. of acetone. To this solution was added a solution of 1.1 g. of oxalic acid 2 aq. in 10 ml. of acetone, after which the oxalate of the above base crystallised.

780 mg. of substance with melting point 150–157° (decomposition) were obtained. After recrystallisation from ethanol the melting point was 159.5–162° C. (decomposition).

What is claimed is:

1. A compound selected from the group consisting of the indolylethylamines of the formula

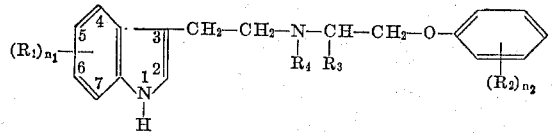

wherein $R_1$ is a mmeber selected from the group consisting of methoxy and hydroxy, $n_1$ is 1 or 2, $R_2$ is a member selected from the group consisting of methoxy and hydroxy, $n_2$ is 0 or 1, $R_3$ is a member selected from the group consisting of hydrogen and alkyl of 1 to 4 carbon atoms inclusive, $R_4$ is a member selected from the group consisting of hydrogen, benzyl, alkyl of 1 to 4 carbon atoms inclusive, and a moiety of the formula

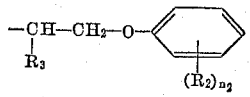

wherein $R_2$, $R_3$ and $n_2$ have their above-designated meanings and the non toxic acid-addition salts thereof.

2. A compound of claim 1 wherein $R_4$ is hydrogen.
3. A compound of claim 1 wherein $R_4$ is benzyl.
4. A compound of claim 1 wherein $R_1$ and $R_2$ are each methoxy.
5. A compound of claim 1 wherein $R_3$ is hydrogen.
6. A compound of claim 1 wherein $R_1$ is methoxy in any of the positions 5 and 6 of the indole skeleton, $R_2$ is selected from the group consisting of ortho methoxy and para methoxy, $R_3$ is hydrogen and $R_4$ is hydrogen.
7. The compound of claim 1 wherein the compound is selected from the group consisting of the base of the formula

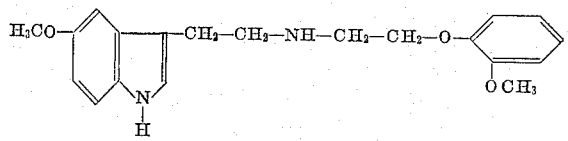

and the non-toxic acid addition salts thereof.

8. The compound of claim 1 wherein the compound is selected from the group consisting of the base of the formula

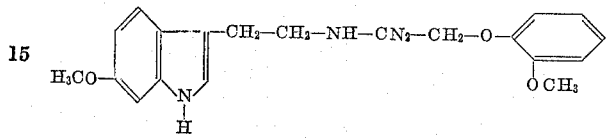

and the non-toxic acid addition salts thereof.

9. The compound of claim 1 wherein the compound is selected from the group consisting of the base of the formula

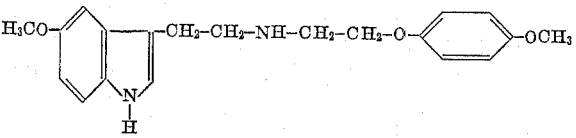

and the non-toxic acid addition salts thereof.

References Cited

UNITED STATES PATENTS 3,067,206   12/1962   Kralt et al. _____ 260—326.15

OTHER REFERENCES

Protiva et al.: Collection Czech. Chem. Commun., vol. 28 (1963), pp. 629–636.

ALEX MAZEL, *Primary Examiner.*

J. NARCAVAGE, *Assistant Examiner.*